(12) United States Patent
Michaels et al.

(10) Patent No.: US 6,856,055 B2
(45) Date of Patent: Feb. 15, 2005

(54) INTERCONNECTING RING AND WIRE GUIDE

(75) Inventors: Paul G. Michaels, St. Louis, MO (US); Kent A. Sheeran, Festus, MO (US); Craig E. Wallace, Brighton, IL (US); Daniel E. Hilton, St. Louis, MO (US); Richard E. Hartsfield, Jr., Chesterfield, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/193,391

(22) Filed: Jul. 11, 2002

(65) Prior Publication Data

US 2004/0007934 A1 Jan. 15, 2004

(51) Int. Cl.[7] .............................................. H02K 11/00
(52) U.S. Cl. ........................................ 310/71; 310/254
(58) Field of Search ........................ 310/254, 216–218, 310/257–259, 52, 71, 260

(56) References Cited

U.S. PATENT DOCUMENTS

| | | | |
|---|---|---|---|
| 2,688,103 A | 8/1954 | Sheldon ...................... 310/254 |
| 3,947,080 A | 3/1976 | Ege ............................ 252/78.2 |
| 3,984,712 A | * 10/1976 | Hill .............................. 310/71 |
| 4,071,793 A | 1/1978 | Cox .............................. 310/71 |
| 4,090,098 A | 5/1978 | Kranzler et al. .............. 310/71 |
| 4,177,397 A | 12/1979 | Lill .............................. 310/71 |
| 4,260,917 A | 4/1981 | Lundin et al. ................. 310/71 |
| 4,283,105 A | 8/1981 | Ferrill et al. .............. 339/97 R |
| 4,484,096 A | * 11/1984 | Sauerwein et al. ......... 310/260 |
| 4,506,180 A | * 3/1985 | Shizuka et al. ................ 310/91 |
| 4,563,053 A | 1/1986 | Pavel .......................... 339/242 |
| 4,605,275 A | 8/1986 | Pavel ...................... 339/119 R |
| 4,765,054 A | 8/1988 | Sauerwein et al. ........... 29/596 |
| 4,790,778 A | 12/1988 | Seidenbusch ............... 439/811 |
| 5,320,558 A | 6/1994 | von Roretz ................. 439/441 |
| 5,425,080 A | 6/1995 | Abbie .......................... 379/98 |
| 5,484,306 A | 1/1996 | Mawby et al. .............. 439/441 |
| 5,506,379 A | 4/1996 | McLean, Jr. et al. ....... 200/558 |

(List continued on next page.)

FOREIGN PATENT DOCUMENTS

| | | |
|---|---|---|
| DE | 19818433 A1 | 11/1998 |
| GB | 2 325 787 A | 12/1998 |
| GB | 2 333 647 A | 7/1999 |

Primary Examiner—Tran Nguyen
Assistant Examiner—Leda Pham
(74) Attorney, Agent, or Firm—Harness, Dickey & Pierce, P.L.C.

(57) ABSTRACT

An interconnecting ring and wire guide for an electric machine includes an annular radial ring having a radially inner edge and a radially outer edge. An axial ring projects axially from the radially inner edge of the annular radial ring. A guide positioner positions the annular radial ring and the axial ring relative to the electric machine. Wire dividers are located on a radially outer surface of the radial ring. The wire dividers include a plurality of circumferential projections that are formed on the radially outer surface of the radial ring. A plurality of wire guides are located adjacent to a radially outer edge of the annular radial ring. Indicia on an outer surface of the annular radial ring identifies at least one of a mounting position for the interconnecting ring and wire guide and a wiring schematic for phases wiring of the electric machine.

37 Claims, 12 Drawing Sheets

U.S. PATENT DOCUMENTS

| | | | | |
|---|---|---|---|---|
| 5,508,571 A | * | 4/1996 | Shafer, Jr. | 310/71 |
| 5,614,757 A | | 3/1997 | Person et al. | 257/531 |
| 5,729,072 A | | 3/1998 | Hirano et al. | 310/256 |
| 5,860,829 A | | 1/1999 | Hower et al. | 439/417 |
| 5,900,687 A | * | 5/1999 | Kondo et al. | 310/71 |
| 5,949,613 A | | 9/1999 | Moir et al. | 360/99.08 |
| 5,953,281 A | | 9/1999 | Matoba | 365/230.05 |
| 6,088,738 A | | 7/2000 | Okada | 709/245 |
| 6,127,753 A | | 10/2000 | Yamazaki et al. | 310/71 |
| 6,127,760 A | * | 10/2000 | Nagasaki et al. | 310/254 |
| 6,210,208 B1 | | 4/2001 | Barnes et al. | 439/441 |
| 6,211,587 B1 | * | 4/2001 | Enomoto et al. | 310/52 |
| 6,216,161 B1 | | 4/2001 | Feigenbaum et al. | 709/225 |
| 6,628,023 B1 | * | 9/2003 | Paquet | 310/71 |

* cited by examiner

INTERCONNECTING RING AND WIRE GUIDE

FIELD OF THE INVENTION

The present invention relates to electric machines, and more particularly to an interconnecting ring and wire guide for an electric machine.

BACKGROUND OF THE INVENTION

Electric machines, such as motors and generators, typically include a stator that is mounted inside a housing and a rotor that is supported for rotation relative to the stator. Some brushless permanent magnet electric machines include a segmented stator with a plurality of stator segment assemblies. The stator segment assemblies typically include a stator core, an end cap assembly, and winding wire. Some switched reluctance electric machines also include a segmented stator.

The winding wires of the stator segment assemblies are wound around the stator core and the end cap assembly. Opposite ends of the winding wire are connected to insulation displacement connectors (IDC) or wound around terminals that are integrated with the end cap assembly. Additional wire connects the IDC or wiring terminals to form phases of the electric machine.

One phase wiring approach involves manually interconnecting the stator segment assemblies using insulated winding wire. This approach has a relatively high cost. In addition, loose phase wires laying randomly on top of coils of the electric machine may cause degradation of the electrical characteristics of the electric machine. Lack of adequate strain relief for jumper wires and lead wires may cause reliability problems. Solutions include resin potting the phase wiring and/or using single or multi-strand insulated phase wires. Other solutions include using a printed circuit board instead of phase wires, which has a relatively high cost.

SUMMARY OF THE INVENTION

An interconnecting ring and wire guide according to the present invention for an electric machine includes an annular radial ring having a radially inner edge and a radially outer edge. An axial ring projects axially from the radially inner edge of the annular radial ring.

In other features of the invention, a guide positioner positions the annular radial ring and the axial ring relative to the electric machine. Wire dividers are located on a radially outer surface of the radial ring. The wire dividers include a plurality of circumferential projections that are formed on the radially outer surface of the radial ring. The wire dividers physically separate wires associated with first, second and third phases of the electric machine.

In other features, a plurality of wire guides are located adjacent to a radially outer edge of the annular radial ring. The wire guides are "L"-shaped projections that are positioned at angles with respect to a radial direction. Indicia on an outer surface of the annular radial ring identifies at least one of a mounting position for the interconnecting ring and wire guide and a wiring schematic for wiring phases of the electric machine.

In still other features, the electric machine is a segmented stator electric machine. The guide positioner includes legs that extend axially from the axial ring. The legs include a mating surface for engaging adjacent stator segments of the electric machine. The mating surface includes a projection that abuts corners of stator cores of adjacent stator segment assemblies.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
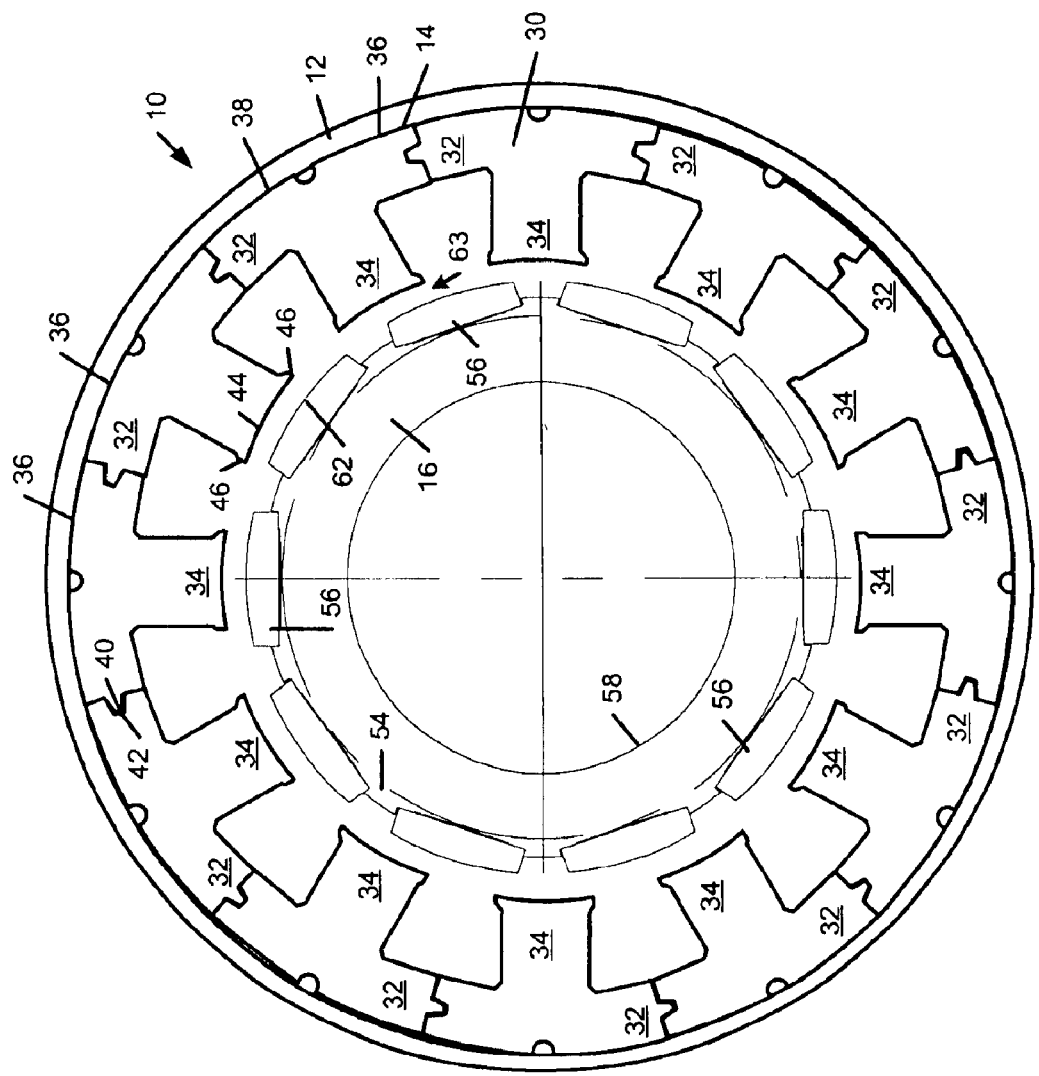
FIG. 1A is a partial cross-sectional view showing a segmented stator, a rotor and a housing of an exemplary electric machine.

The following description of the preferred embodiment(s) is merely exemplary in nature and is in no way intended to limit the invention, its application, or uses. For purposes of clarity, the same reference numbers will be used in the drawings to identify similar elements.

The interconnecting ring and wire guide according to the present invention improves phase wiring connections between segmented stator assemblies in an electric machine. The interconnecting ring and wire guide also retains individual connecting phase wires, separates them, and maintains axial and radial positioning of the phase wires relative to the stator.

The interconnecting ring and wire guide includes wire dividers that separate the phase wires. The wire dividers prevent the phase wires from entering the stator bore. The interconnecting ring and wire guide includes positioning indicia to locate the interconnecting ring and wire guide relative to the electric machine. The location indicia also may include a wiring schematic or wiring information to assist assembly workers during phase wiring.

Referring now to FIG. 1A, an exemplary brushless permanent magnet electric machine 10 is shown. The electric machine 10 includes a housing 12 and a segmented stator 14 mounted in the housing 12. A rotor 16 is supported for rotation relative to the segmented stator 14. While the present invention will be described in conjunction with brushless permanent magnet electric machines, the present invention may also be used with other types of electric machines such as switched reluctance electric machines. For additional details concerning segmented stator switched reluctance electric machines, see U.S. patent Ser. No. 09/803,876, Filed Mar. 12, 2001, "Segmented Stator Switched Reluctance Machine", and Ser. No. 09/754,537, Filed Jan. 4, 2001, "End Cap Assembly for a Switched Reluctance Electric Machine", which are hereby incorporated by reference. As can be appreciated, the interconnecting ring and wire guide can also be utilized with other segmented and non-segmented stator electric machines.

Figure 1B:
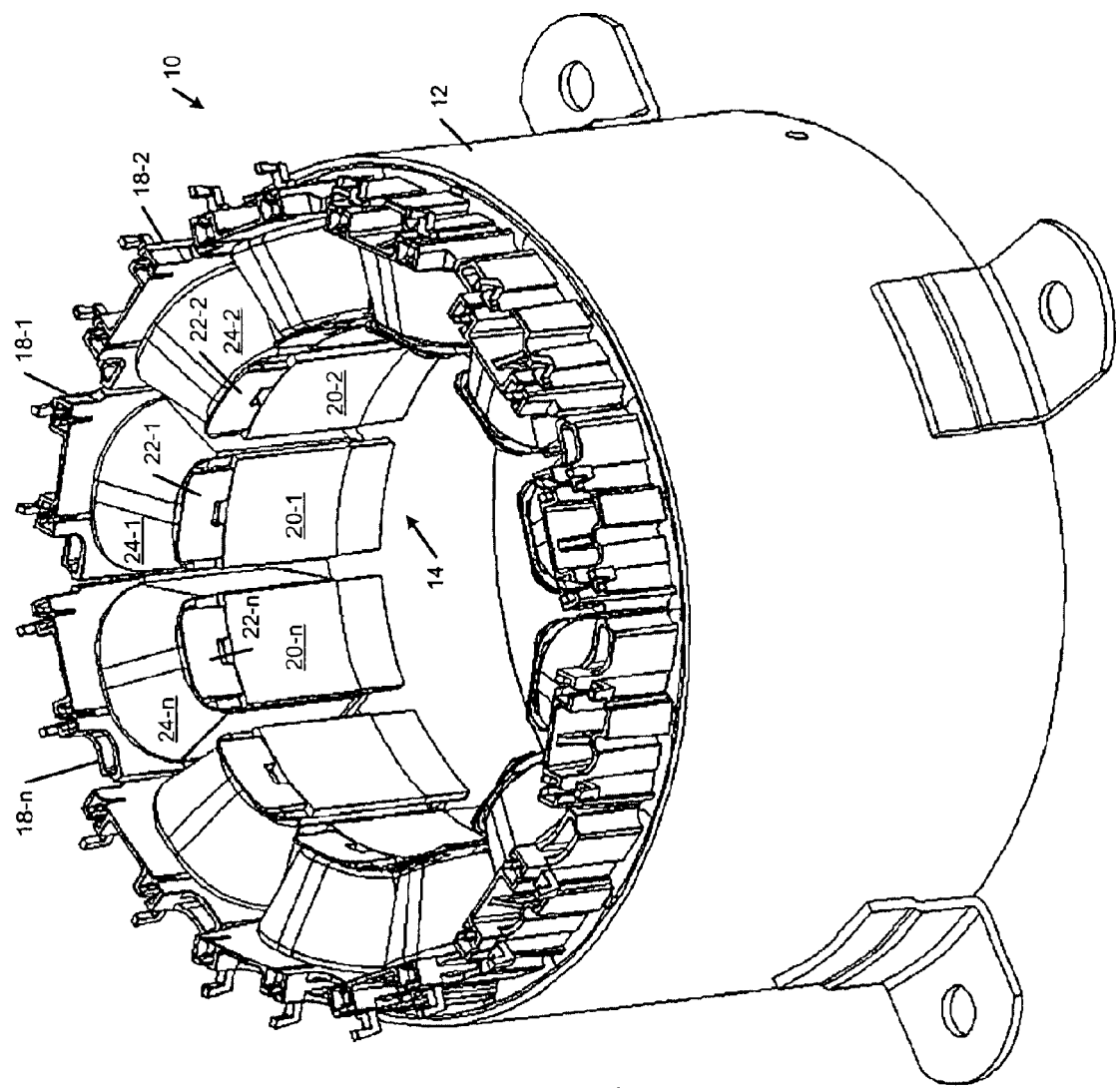
FIG. 1B is a perspective view of an assembled segmented stator electric machine with the rotor omitted.

Referring now to FIG. 1B, the segmented stator 14 includes a plurality of stator segment assemblies 18-1, 18-2, ..., and 18-n (collectively referred to as 18) that are assembled inside of the housing 12. The stator segment assemblies 18-1, 18-2, ..., and 18-n include stator segment cores 20-1, 20-2, ..., and 20-n and end cap assemblies 22-1, 22-2, ..., and 22-n. Winding wire 24-1, 24-2, ..., and 24-n is wound around the stator segment cores 20-1, 20-2, ..., and 20-n and the end cap assemblies 22-1, 22-2, and 22-n.

The stator segment core 20 includes a solid core or a stack of individual stator plates. The stator plates preferably have a shape identified at 30 in FIG. 1A, although other shapes may be used. Each of the stator plates 30 includes an arcuate outer rim section 32 and a tooth-shaped pole section 34. An outer edge surface 36 of the outer rim section 32 is shaped for mating with an inner wall surface 38 of the housing 12. An inner edge surface of the outer rim section 32 is usually arcuate, and is generally concentric with the outer edge surface 36. The outer rim section 32 optionally includes a tongue projection 40 formed on one edge surface and a groove 42 on its opposite edge surface. The pole section 34 of the stator plates has an arcuate inner edge surface 44 and a pair of circumferentially-extending projections 46.

Figure 1D:
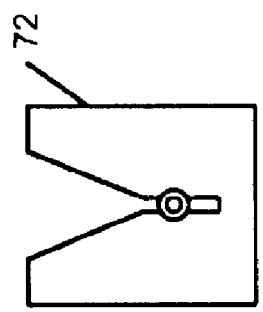
FIG. 1D illustrates an insulation displacement connector (IDC) of a stator segment assembly.
Figure 1C:
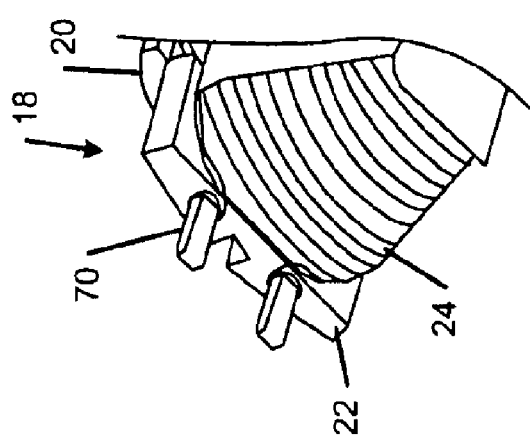
FIG. 1C illustrates terminals of a stator segment assembly.

The rotor 16 includes a circular rim section 54 and a plurality of permanent magnets 56 that attached along the rim section 54. A circular bore 58 is formed in the rotor 16. A rotor shaft (not shown) is received by the circular bore 58 of the rotor 16. In the particular embodiment shown, the rotor 16 has eight equally-spaced permanent magnets 56 and the segmented stator 14 has twelve equally-spaced pole sections. Other rotor pole and stator pole combinations are also contemplated. In addition, the permanent magnets 56 have an arcuate outer edge surface 62 that defines an air gap 63 with respect to the arcuate inner edge surface 44 on the pole sections 34 of the stator plates. The end cap assemblies 22 may employ terminals 70 as shown in FIG. 1C, IDC connectors 72 shown in FIG. 1D, or any other suitable approach for connecting the opposite ends of the winding wire 24 to the phase wires.

Figure 2:
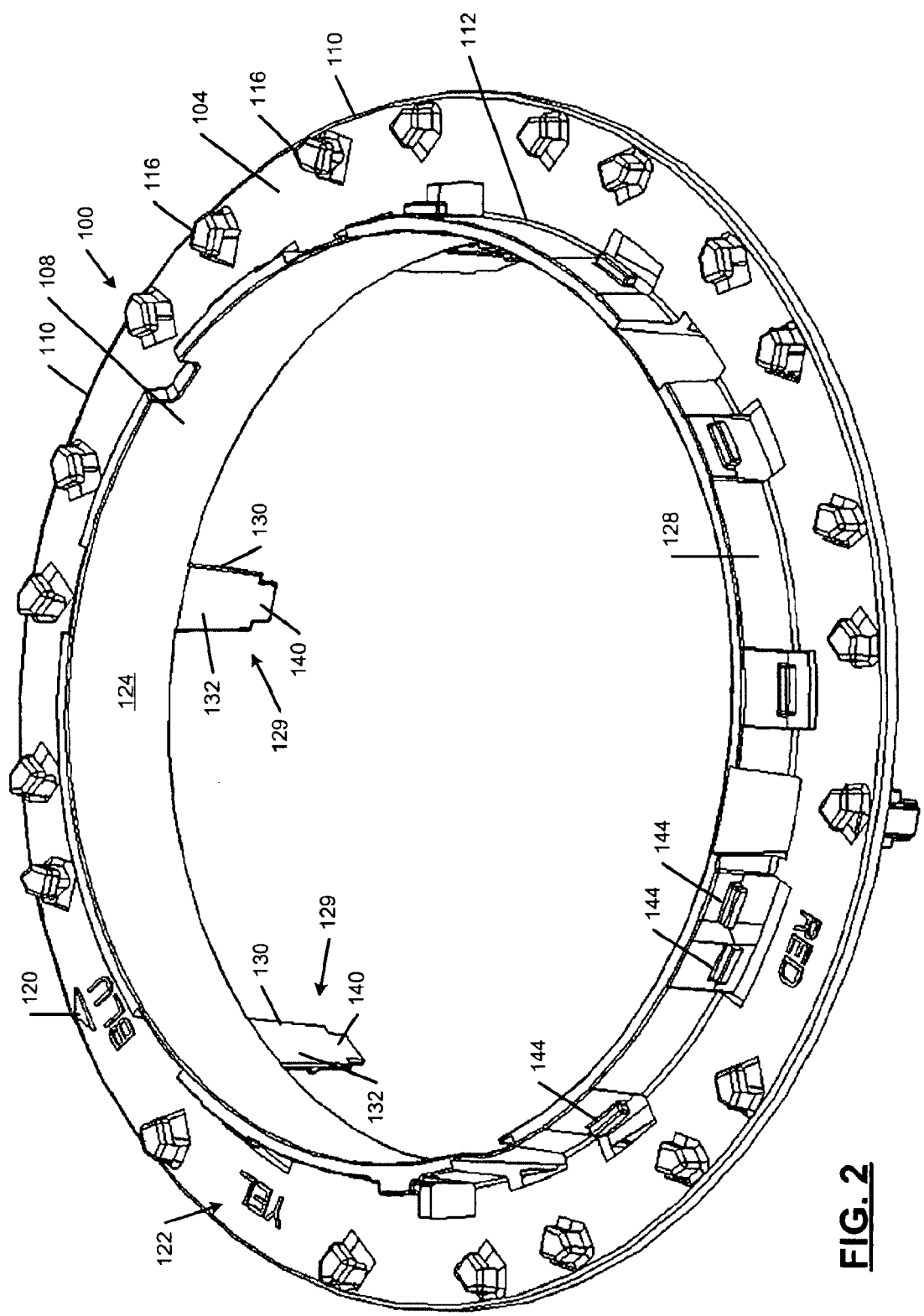
FIG. 2 is a top perspective view of an interconnecting ring and wire guide according to the present invention.

Referring now to FIG. 2, an interconnecting ring and wire guide 100 according to the present invention is shown. The interconnecting ring and wire guide 100 includes an annular radial ring 104 and an axial ring 108. The annular radial ring 104 includes a radially outer edge 110 and a radially inner edge 112. A plurality of wire guides 116 are located adjacent to the radially outer edge 110. Indicia such as guide location markings (an arrow 120) and/or wiring markings (such as power lead callouts 122) are formed in, applied to and/or otherwise marked on the annular radial ring 104.

The axial ring 108 abuts the annular radial ring 104. Preferably, the axial ring 108 is connected to and/or formed on the radially inner edge 112 of the annular radial ring 104. The axial ring 108 projects in first and second axial directions from the annular radial ring 104. The first axial direction is a direction away from the electric machine 10. The second axial direction is a direction towards the electric machine 10. The axial ring 108 includes a radially inner surface 124 and a radially outer surface 128.

The interconnecting ring and wire guide 100 includes a guide positioner 129 that positions the guide 100 relative to the electric machine 10. The guide positioner 129 preferably includes one or more legs 130-1, 130-2, ..., and 130-x that project in the second axial direction from at least one of the annular radial ring 104 and the axial ring 108. In a preferred embodiment, the legs 130 project from the axial ring 108. A radially inner surface 132 of the legs 130 is preferably co-planar with the radially inner surface 124. The legs 130 define a projection 140. The axial ring 108 also includes a plurality of axially and/or circumferentially spaced wire dividers 144, which are formed on the radially outer surface 128. The wire dividers 144 separate the connecting phase wires.

Figure 3:
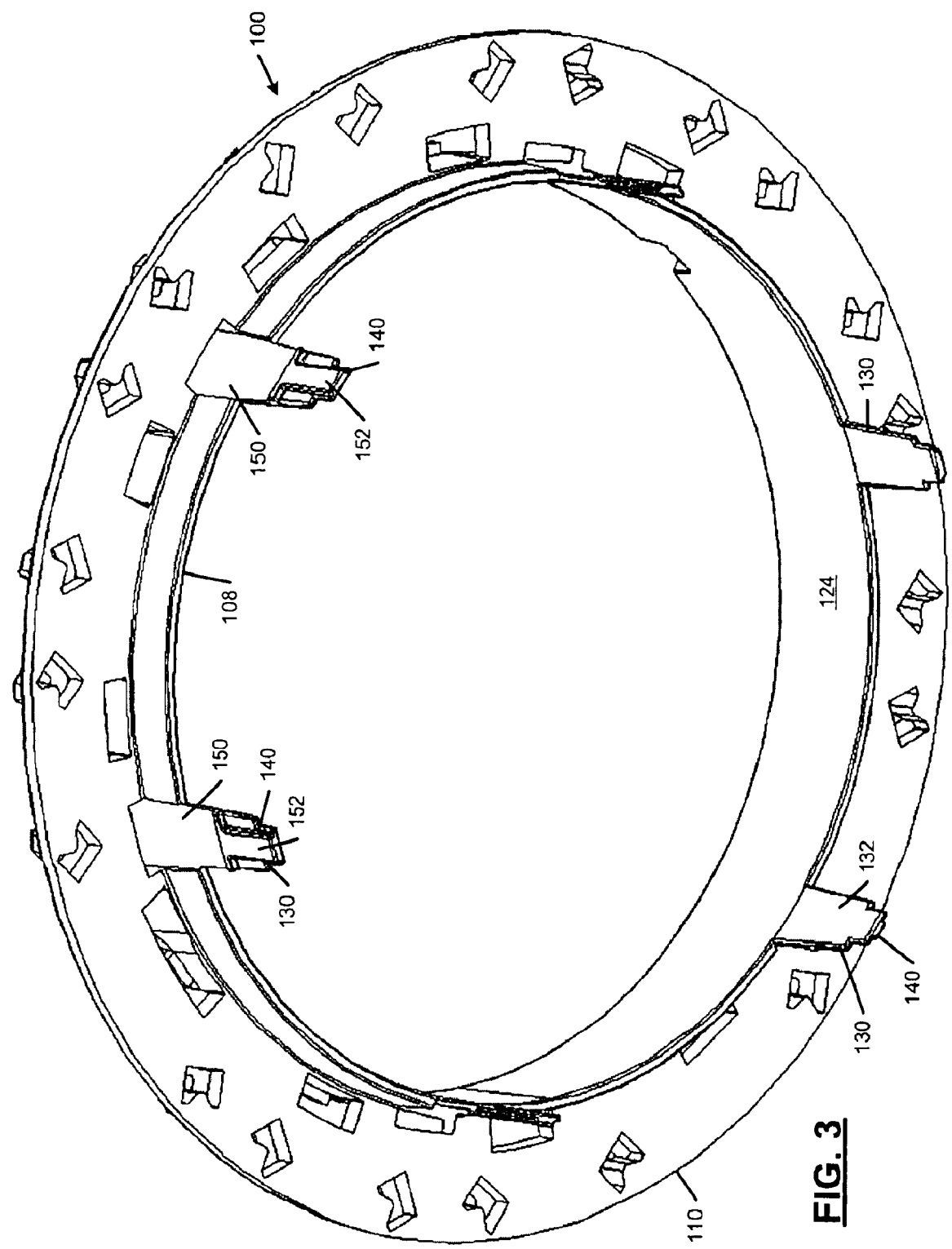
FIG. 3 is a bottom perspective view of the interconnecting ring and wire guide.

Referring now to FIG. 3, the axial ring 108 preferably extends beyond the annular radial ring 104 in the second axial direction to provide additional reinforcement for the legs 130. A radially outer surface 150 of the legs 130 defines a key-like projection 152. The key-like projection 152 can be a "T"-shaped projection that is shown in FIG. 3. The key-like projections 152 can also have other shapes. The projection 140 and the key-like projection 152 are engaged by the end cap assemblies 22 and stator segment cores of adjacent stator segment assemblies 18. Preferably, the stator segment assemblies 18 bias the legs 130 in a radially inward direction when assembled.

Figure 4:
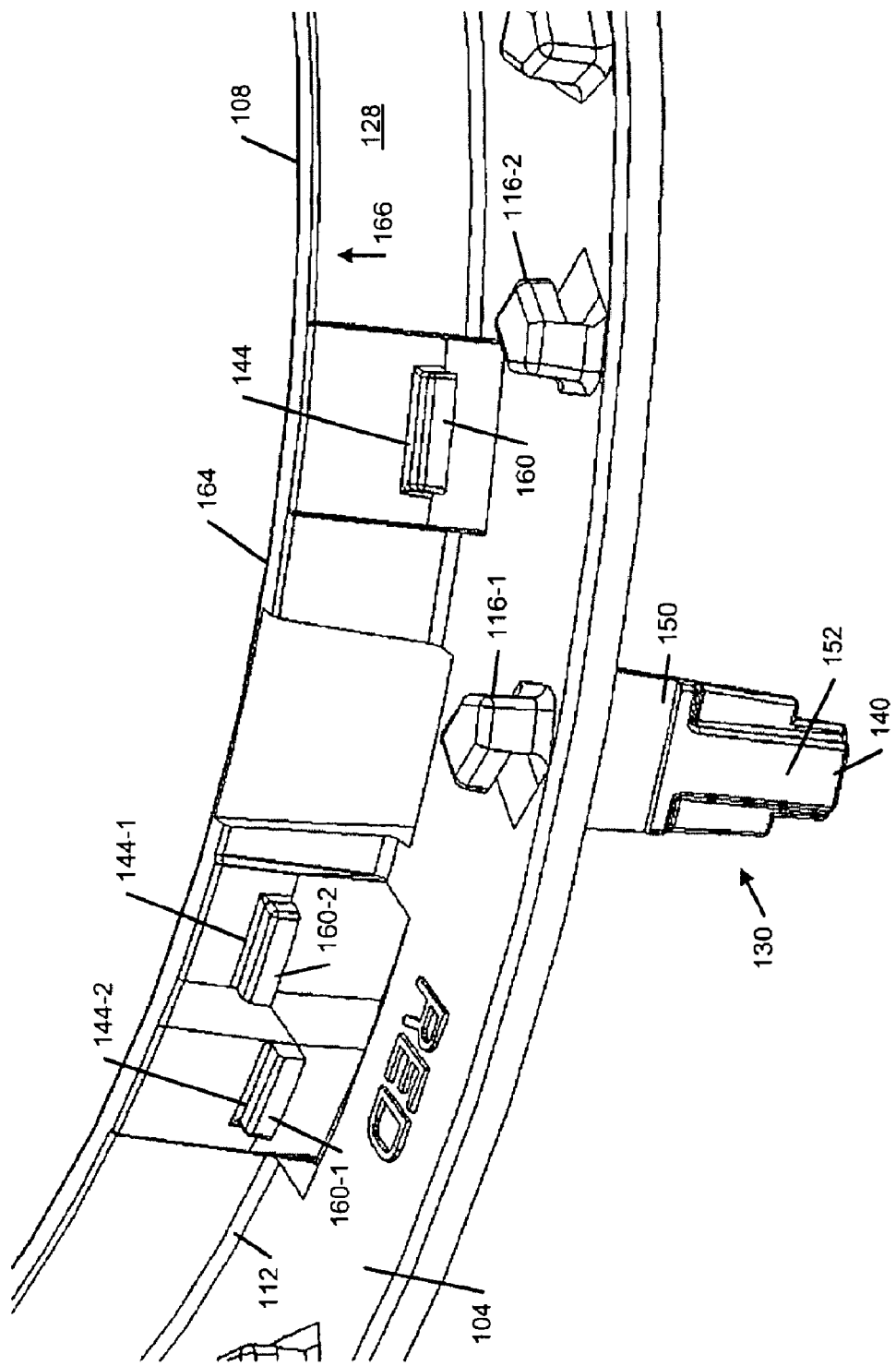
FIG. 4 is a top partial perspective view of the interconnecting ring and wire guide.

Referring now to FIG. 4, the legs 130, the wire guides 116 and the wire dividers 144 are illustrated in more detail. The wire guides 116 are preferably "L"-shaped and are usually rotated relative to a radial direction. For example, the wire guides 116-1 and 116-2 are rotated relative to a radial direction. The wiring guides 116 are located adjacent to a radial line of the associated terminal or IDC and between the radial line and a direction that the phase wire for the associated terminal or IDC originates.

The wire dividers 144 include circumferential projections 160 that are formed on the radially outer surface 128 of the axial ring 108. For example, wires from the three phases are separated by two circumferential projections 160-1 and 160-2. A first phase is positioned between the annular radial ring 104 (adjacent to the radially inner edge 112) and the projection 160-1. A second phase is positioned between the projection 160-1 and the projection 160-2. A third phase is positioned between the projection 160-2 and an axially outer edge 164 of the axial ring 108. The axially outer edge 164 preferably includes a flange 166 to improve wire retention.

Figure 5:
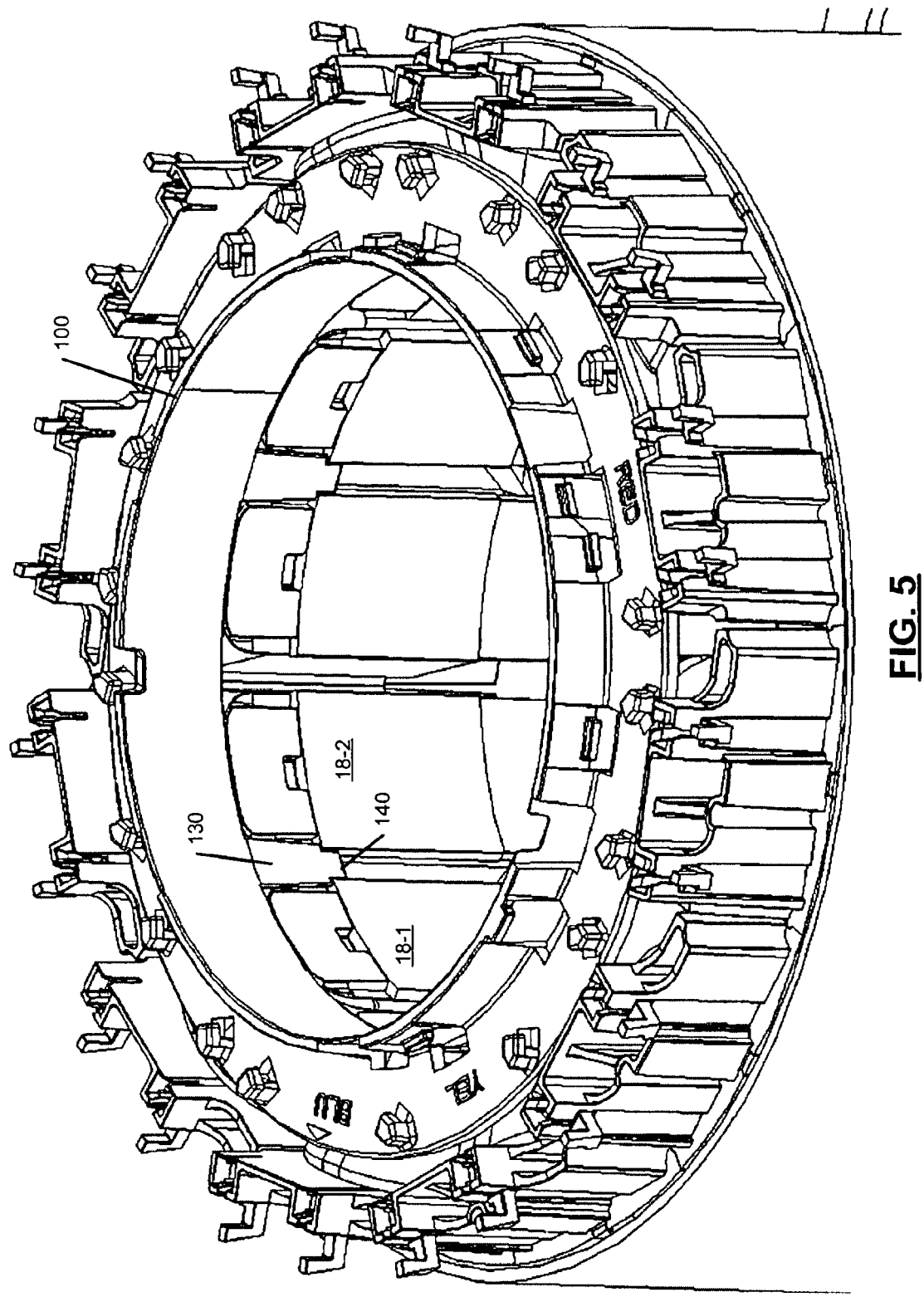
FIG. 5 is a perspective view of the interconnecting ring and wire guide after installation on the segmented stator electric machine.

Referring now to FIG. 5, the interconnecting ring and wire guide 100 is shown mounted on the segmented stator 14. Edges of the projections 140 are engaged by adjacent stator segment assemblies (such as 18-1 and 18-2). More particularly, the projections 140 are positioned between corners of the stator segment core. An axially inner edge portion of the axial ring 108 preferably abuts circumferential edge portions of the end cap assembly.

Figure 6:
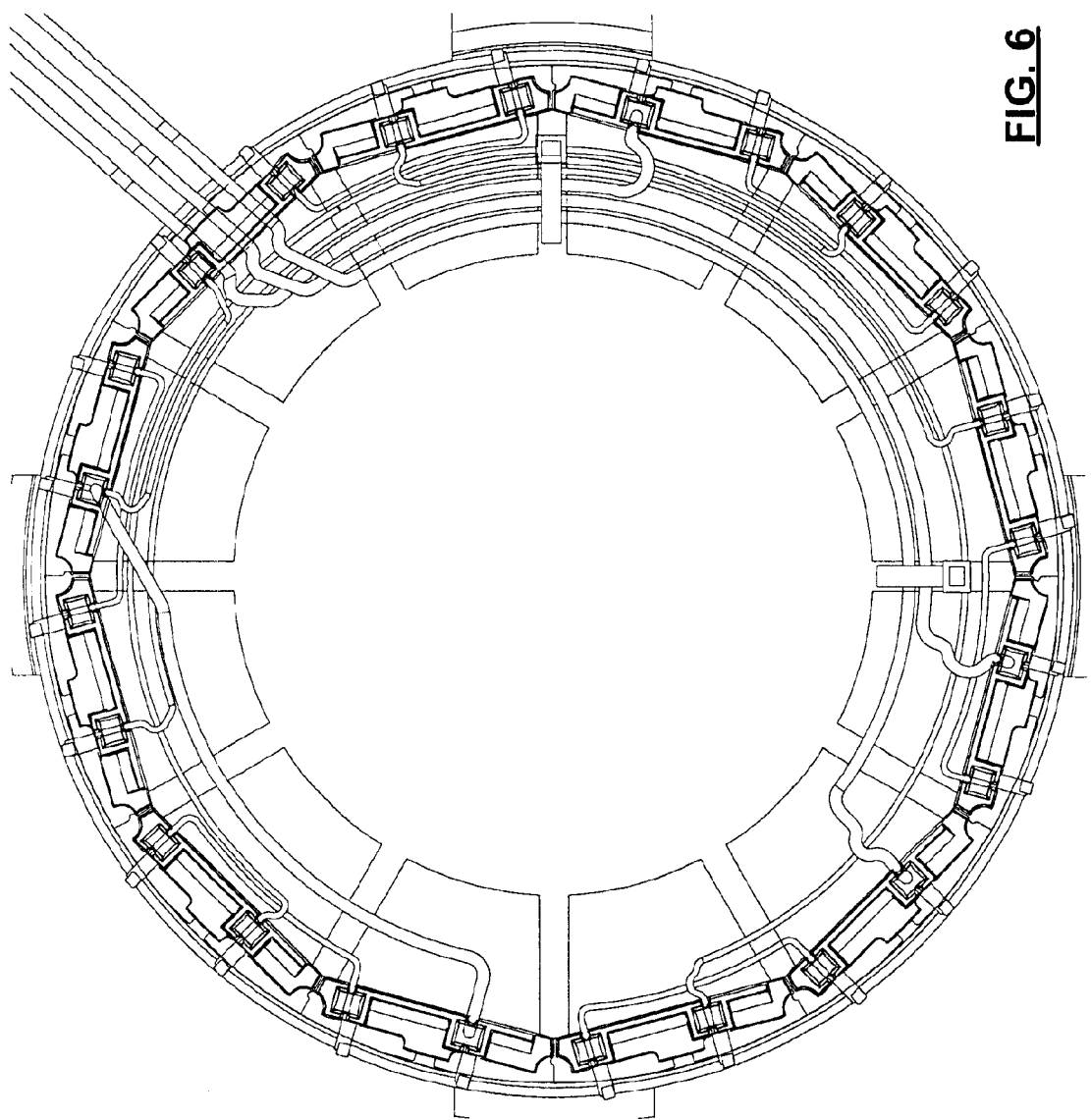
FIG. 6 is an exemplary wiring schematic for the electric machine.
Figure 7:
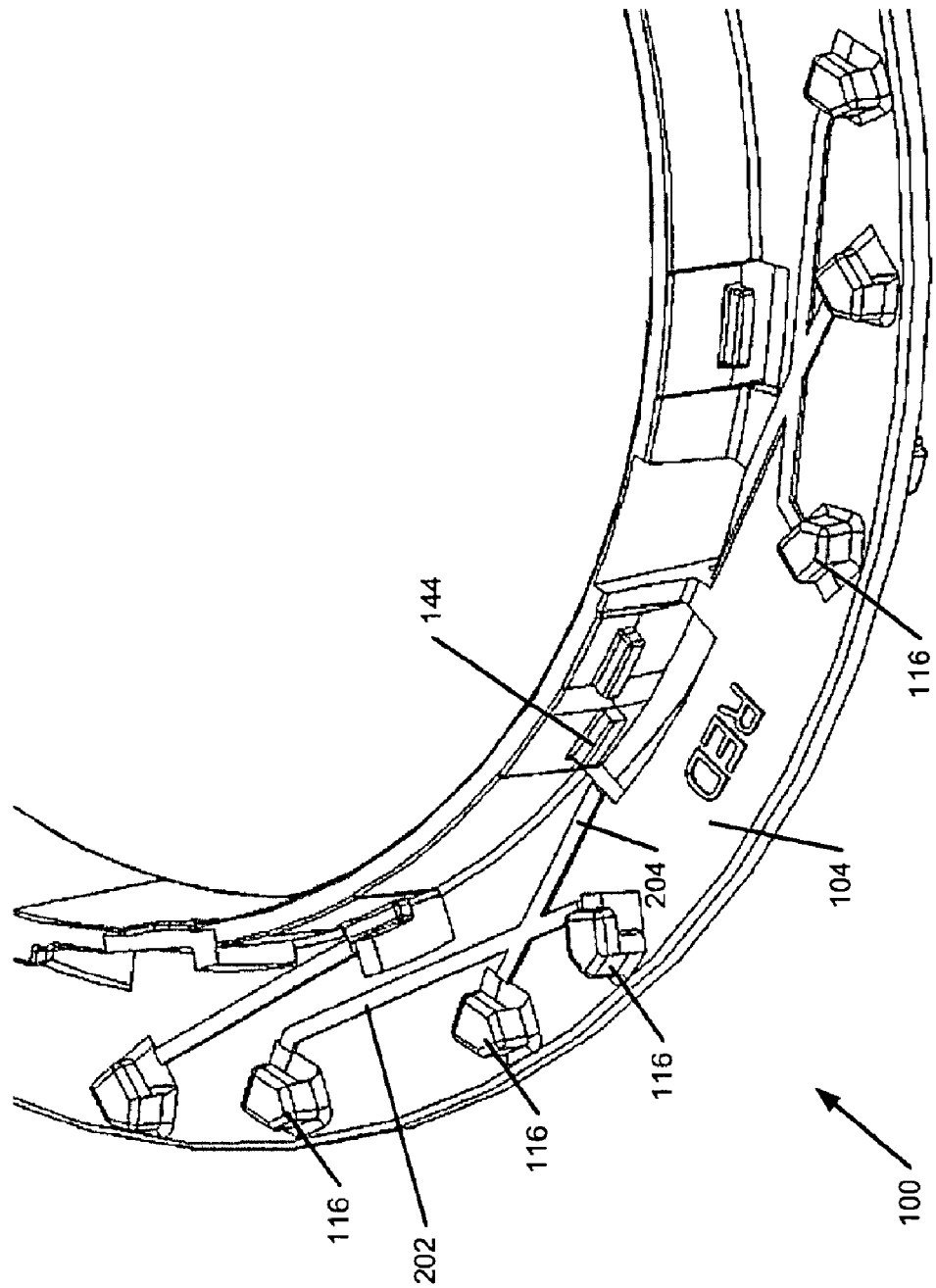
FIG. 7 is a partial perspective view illustrating a wiring schematic molded integrally with the annular radial ring.

Referring now to FIG. 6, an exemplary wiring schematic for the electric machine 10 is illustrated. The interconnecting ring and wire guide facilitates the use of automated wiring machines. Referring now to FIG. 7, the interconnecting ring and wire guide 100 includes a wiring schematic for the phase wires. The wiring schematic is molded integrally or otherwise marked on the annular radial ring 104 to assist during wiring of the phase wires. For example, the wiring schematic illustrates a connection 202 between two wire guides 116 and a connection 204 from the wire divider 144 to the wire guide 116.

Figure 8:
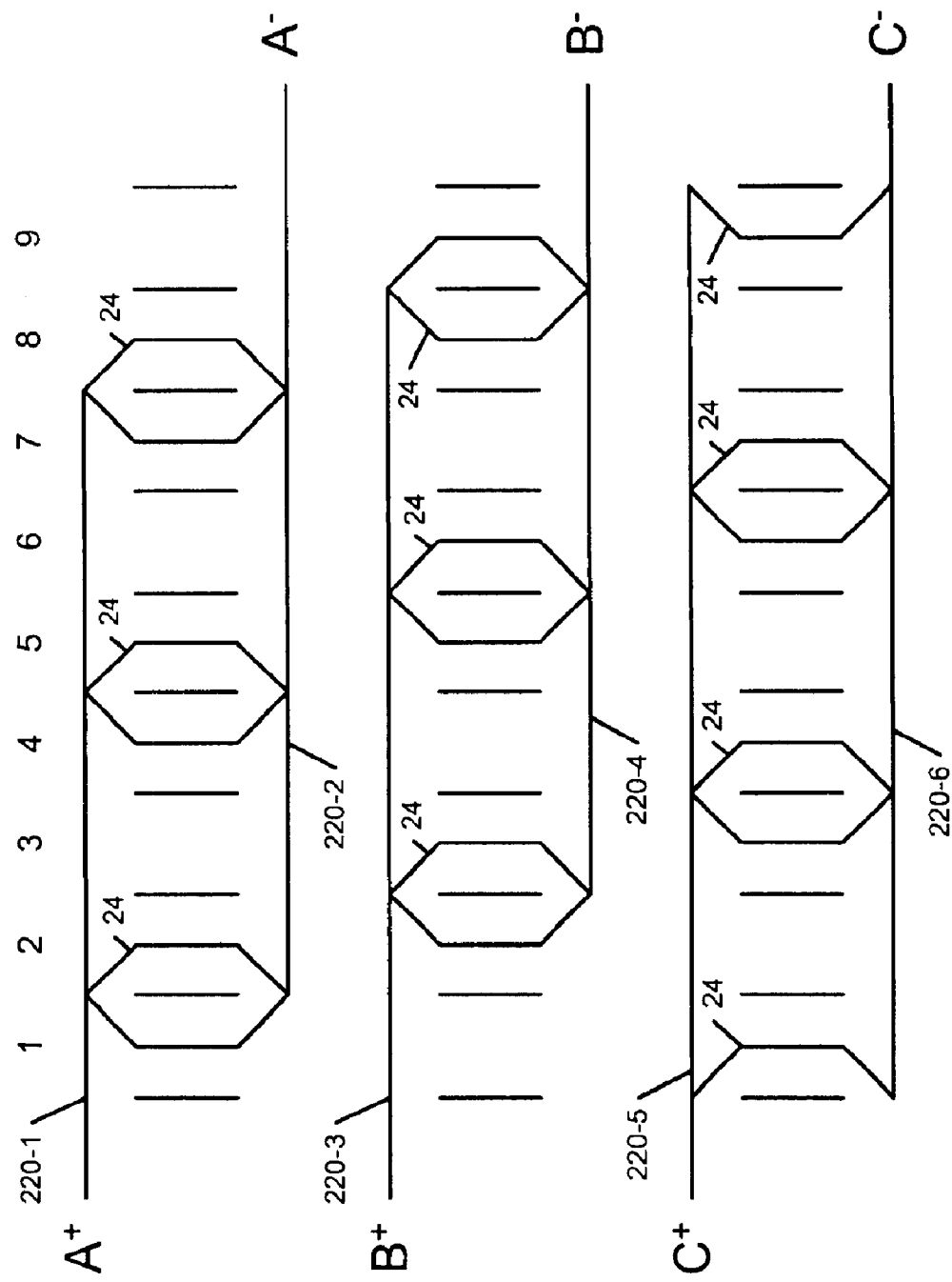
FIG. 8 is an exemplary wiring schematic for an exemplary six pole/9 slot electric machine.
Figure 9:
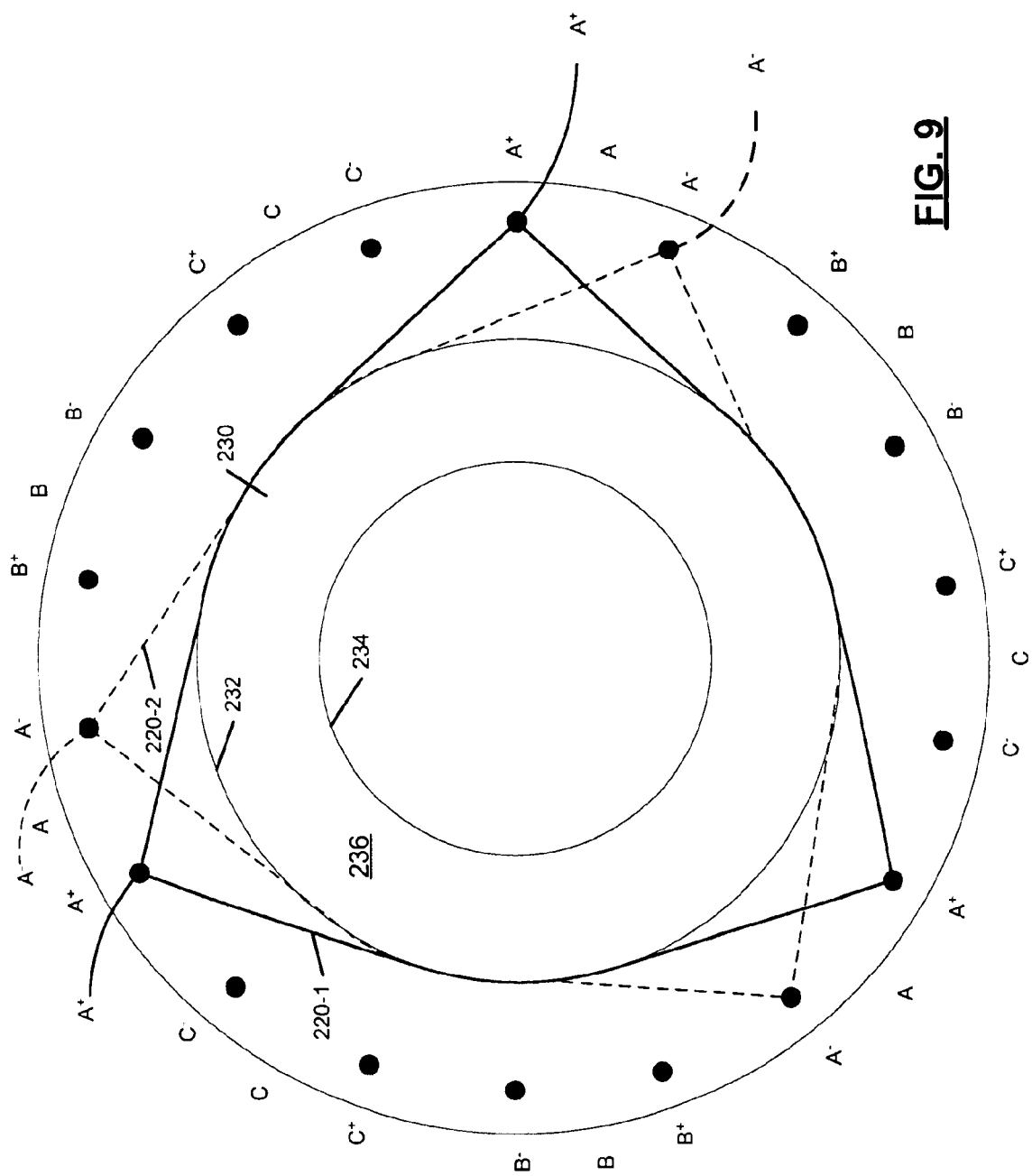
FIG. 9 is a plan view of an alternate interconnecting ring and wire guide.
Figure 10:
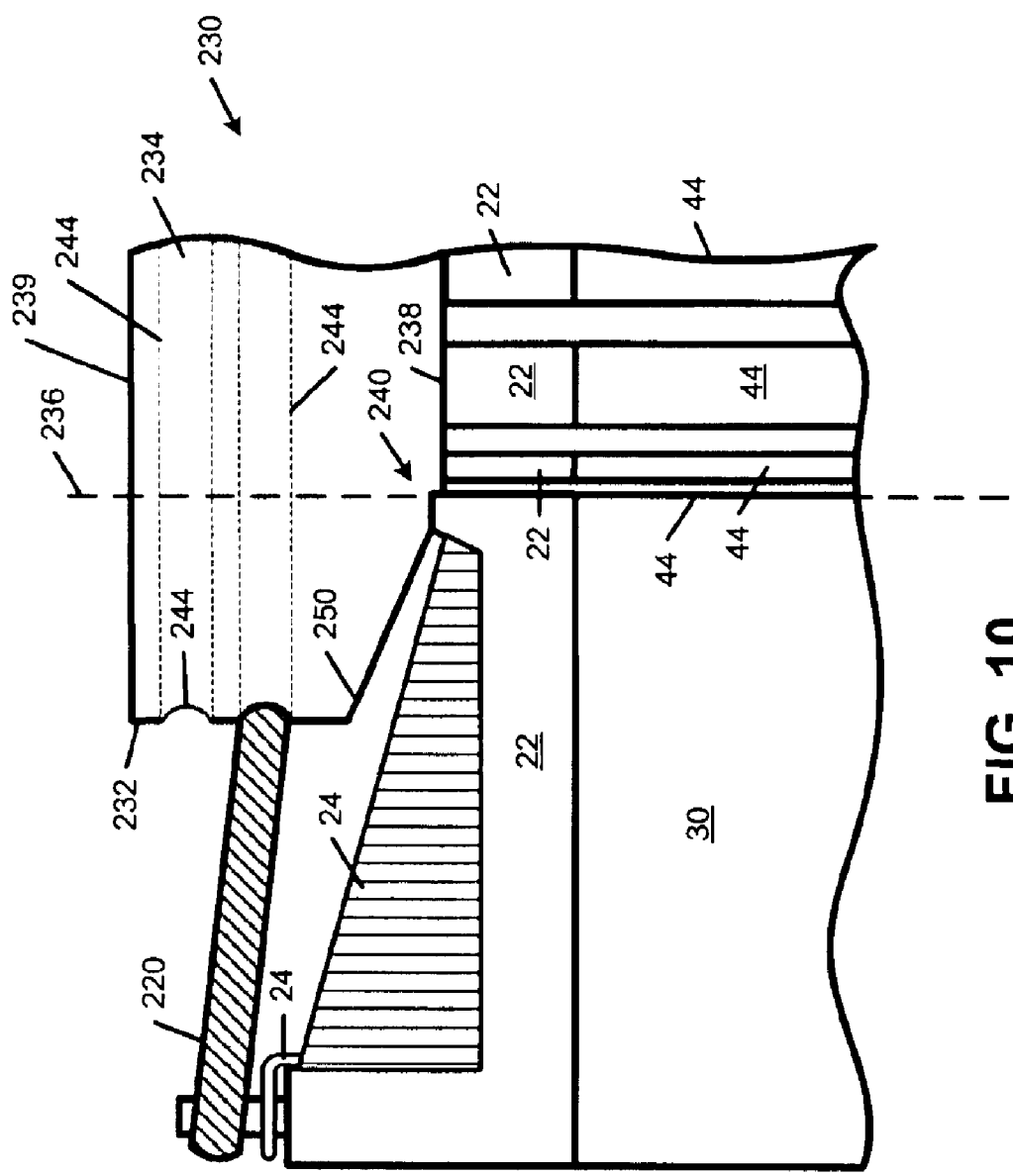
FIG. 10 is a partial cross-sectional view of the alternate interconnecting ring and wire guide.

Referring now to FIG. 8, an exemplary wiring schematic for a 6 pole/9 slot electric machine is shown. Phase wires 220-1, 220-2, . . . , and 220-6 interconnect winding wires 24 to form phases of the electric machine. Referring now to FIGS. 9 and 10, an alternate interconnecting ring and wire guide 230 has a generally annular shape and includes a radially outer surface 232, a radially inner surface 234, an axially outer surface 236, and an axially inner surface 238. The radially inner surface 234 is preferably concentric with the stator bore. In FIG. 10, a radially inner edge of a stator bore is shown by dotted line 239.

In an exemplary implementation, the interconnecting ring and wire guide 230 includes a notched surface 240 formed along the radially inner surface 238 that mates with a radially inner edge of end cap assemblies 22 of the stator segment assemblies 18. The interconnecting ring and wire guide 230 can be connected to the stator 14 using a force fit between the interconnecting ring and wire guide 230 and the end cap assembly 22, retention provided by the phase wires 220, adhesive, mechanical connectors, legs, and/or any other suitable method.

The interconnecting ring and wire guide 230 preferably includes one or more grooves 244 formed in the radially outer surface 232 of the interconnecting ring and wire guide 230. The interconnecting ring and wire guide 230 may also include an angled surface 250 between the axially inner surface 238 and the radially outer surface 232. The angled surface 250 provides clearance for winding wire 24 on the stator segment assemblies 18. The phase wires 220 are received in and positioned by the grooves 244. As can be appreciated, the stator 14 can be segmented or non-segmented. The connection to the stator 14 can be made with IDCs, terminals, hook terminals, directly to the winding wire, or in any other suitable manner.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An interconnecting ring and wire guide for an electric machine having multiple phase wires that form windings about stator teeth, comprising:
    an annular radial ring that is disposed adjacent to said windings and that has a radially inner edge and a radially outer edge, said annular radial ring engaging said multiple phase wires to guide said multiple phase wires;
    an axial ring that projects axially from said radially inner edge of said annular radial ring; and
    a guide positioner that positions said annular radial ring and said axial ring relative to said electric machine.

2. The interconnecting ring and wire guide of claim 1 further comprising wire dividers that are located on a radially outer surface of said axial ring.

3. The interconnecting ring and wire guide of claim 2 wherein said wire dividers include a plurality of circumferential projections that are formed on said radially outer surface of said axial ring.

4. The interconnecting ring and wire guide of claim 3 wherein said circumferential projections are spaced at least one of axially and circumferentially.

5. The interconnecting ring and wire guide of claim 4 wherein said wire dividers physically separate said multiple phase wires associated with first, second and third phases of said electric machine.

6. The interconnecting ring and wire guide of claim 1 further comprising a plurality of wire guides that are located adjacent to a radially outer edge of said annular radial ring.

7. The interconnecting ring and wire guide of claim 6 wherein said wire guides are "L"-shaped projections that are positioned at angles with respect to a radial direction.

8. The interconnecting ring and wire guide of claim 1 further comprising indicia on an outer surface of said annular radial ring that identifies at least one of a mounting position for said interconnecting ring and wire guide and a wiring schematic for wiring phases of said electric machine.

9. The interconnecting ring and wire guide of claim 5 wherein said indicia include power lead callouts.

10. The interconnecting ring and wire guide of claim 8 wherein said indicia include a location indicator.

11. The interconnecting ring and wire guide of claim 1 wherein said electric machine is a segmented stator electric machine.

12. The interconnecting ring and wire guide of claim 11 wherein said guide positioner includes legs that extend axially from said axial ring and wherein said legs include a mating surface for engaging adjacent stator segments of said electric machine.

13. The interconnecting ring and wire guide of claim 12 wherein said mating surface includes a projection that is positioned between corners of stator cores of adjacent stator segment assemblies.

14. An interconnecting ring and wire guide for a segmented stator electric machine having multiple phase wires that form windings about stator teeth, comprising:
    an annular radial ring that is disposed adjacent to said windings and that has a radially inner edge and a radially outer edge;
    an axial ring that projects axially from said radially inner edge of said annular radial ring and that includes radially inner and outer surfaces; and
    wire dividers that are located on said radially outer surface of said axial ring and that separate said multiple phase wires.

15. The interconnecting ring and wire guide of claim 14 wherein said wire dividers include a plurality of circumferential projections that are formed on said radially outer surface.

16. The interconnecting ring and wire guide of claim 15 wherein said circumferential projections are spaced at least one of axially and circumferentially.

17. The interconnecting ring and wire guide of claim 14 wherein said wire dividers physically separate said multiple phase wires associated with first, second and third phases of said electric machine.

18. An interconnecting ring and wire guide for a segmented stator electric machine having multiple phase wires that form windings about stator teeth, comprising:

an annular radial ring that is disposed adjacent to said windings and that has a radially inner edge and a radially outer edge and that engages said multiple phase wires to guide said multiple phase wires;

an axial ring that projects axially from said radially inner edge of said annular radial ring and that includes radially inner and outer surfaces;

indicia on an outer surface of said annular radial ring that identify at least one of a mounting position of said interconnecting ring and wire guide and a wiring schematic for phase wiring of said electric machine; and wire dividers that are located on said radially outer surface of said axial ring and that separate said multiple phase wires.

19. The interconnecting ring and wire guide of claim 18 wherein said indicia include power lead callouts.

20. The interconnecting ring and wire guide of claim 18 wherein said indicia include a location indicator.

21. An interconnecting ring and wire guide for an electric machine having multiple phase wires that form windings about stator teeth, comprising:

an annular radial ring that is disposed adjacent to said windings and that has a radially inner edge and a radially outer edge;

a plurality of wire guides that are located adjacent to a radially outer edge of said annular radial ring for positioning and guiding said multiple phase wires of said electric machine; and an axial ring that projects axially from said radially inner edge of said annular radial ring.

22. The interconnecting ring and wire guide of claim 21 further comprising:

a guide positioner that positions said annular radial ring and said axial ring relative to said electric machine.

23. The interconnecting ring and wire guide of claim 22 further comprising wire dividers that are located on a radially outer surface of said axial ring.

24. The interconnecting ring and wire guide of claim 23 wherein said wire dividers include a plurality of circumferential projections that are formed on said radially outer surface of said axial ring.

25. The interconnecting ring and wire guide of claim 24 wherein said circumferential projections are spaced at least one of axially and circumferentially.

26. The interconnecting ring and wire guide of claim 25 wherein said wire dividers physically separate wires associated with first, second and third phases of said electric machine.

27. The interconnecting ring and wire guide of claim 21 wherein said wire guides are "L"-shaped projections that are positioned at angles with respect to a radial direction.

28. An interconnecting ring and wire guide for supporting and guiding multiple phase wires that form windings about stator teeth of an electric machine with a stator, comprising:

an annular ring that is disposed adjacent to said windings and that has radially inner and outer surfaces and axially inner and outer surfaces and that engages said multiple phase wires to guide said multiple phase wires;

a mating surface formed by at least one of said axially inner surface and said radially outer surface for engaging said stator; and a guide positioner that positions said annular ring relative to said electric machine.

29. The interconnecting ring and wire guide of claim 28 further comprising phase wire grooves formed in said radially outer surface of said annular ring for guiding said phase wires.

30. The interconnecting ring and wire guide of claim 28 wherein said stator is a segmented stator that includes stator segment assemblies with an end cap assembly, a stator core, and winding wire that is wound around said end cap assembly and said stator core.

31. The interconnecting ring and wire guide of claim 30 wherein said mating surface includes a notched surface that receives radially inner edges of said end cap assemblies of said stator segment assemblies.

32. An interconnecting ring and wire guide for supporting and guiding multiple phase wires that form windings about stator teeth of an electric machine with a stator, comprising:

an annular ring that is disposed adjacent to said windings and that has radially inner and outer surfaces and axially inner and outer surfaces;

phase wire grooves formed in said radially outer surface of said annular ring for guiding said multiple phase wires; and a guide positioner that positions said annular ring relative to said electric machine.

33. The interconnecting ring and wire guide of claim 32 further comprising a mating surface formed by at least one of said axially inner surface and said radially outer surface for engaging said stator.

34. The interconnecting ring and wire guide of claim 32 wherein said stator is a segmented stator that includes stator segment assemblies with an end cap assembly, a stator core, and winding wire that is wound around said end cap assembly and said stator core.

35. The interconnecting ring and wire guide of claim 34 wherein said mating surface includes a notched surface that receives radially inner edges of said end cap assemblies of said stator segment assemblies.

36. An interconnecting ring and wire guide for supporting and guiding multiple phase wires that form windings about stator teeth of an electric machine with a segmented stator that includes stator segment assemblies with an end cap assembly and a stator core, comprising:

an annular ring that is disposed adjacent to said windings and that has radially inner and outer surfaces and axially inner and outer surfaces and that engages and guides said multiple phase wires;

a notched surface that receives radially inner edges of said end cap assemblies of said stator segment assemblies; and a guide positioner that positions said annular ring relative to said electric machine.

37. The interconnecting ring and wire guide of claim 36 further comprising phase wire grooves formed in said radially outer surface of said annular ring for guiding said multiple phase wires.

* * * * *

UNITED STATES PATENT AND TRADEMARK OFFICE
CERTIFICATE OF CORRECTION

PATENT NO. : 6,856,055 B2 Page 1 of 1
DATED : February 15, 2005
INVENTOR(S) : Paul G. Michaels et al.

It is certified that error appears in the above-identified patent and that said Letters Patent is hereby corrected as shown below:

Column 6,
Line 26, "5" should be -- 8 --.

Signed and Sealed this

Seventeenth Day of May, 2005

JON W. DUDAS
*Director of the United States Patent and Trademark Office*